United States Patent
Bauco et al.

(10) Patent No.: US 9,891,384 B2
(45) Date of Patent: Feb. 13, 2018

(54) SYSTEMS AND METHODS FOR MULTIPLE-PASS STRIPPING OF AN OPTICAL FIBER COATING

(71) Applicant: CORNING OPTICAL COMMUNICATIONS LLC, Hickory, NC (US)

(72) Inventors: Anthony Sebastian Bauco, Horseheads, NY (US); Klaus Hartkorn, Painted Post, NY (US); Daniel Max Staloff, Rochester, NY (US)

(73) Assignee: Corning Optical Communications LLC, Hickory, NC (US)

( * ) Notice: Subject to any disclaimer, the term of this patent is extended or adjusted under 35 U.S.C. 154(b) by 478 days.

(21) Appl. No.: 14/561,645

(22) Filed: Dec. 5, 2014

(65) Prior Publication Data

US 2016/0161672 A1 Jun. 9, 2016

(51) Int. Cl.
*B29D 11/00* (2006.01)
*G02B 6/245* (2006.01)

(52) U.S. Cl.
CPC ........ *G02B 6/245* (2013.01); *B29D 11/00663* (2013.01)

(58) Field of Classification Search
CPC .......................... B29D 11/00663; G02B 6/245
See application file for complete search history.

(56) References Cited

U.S. PATENT DOCUMENTS

| 5,101,090 A | 3/1992 | Coyle, Jr. et al. |
| 6,509,547 B1 | 1/2003 | Bernstein et al. |
| 6,957,000 B2 | 10/2005 | McAlpine et al. |
| 7,123,802 B2 | 10/2006 | Engberg et al. |
| 8,052,836 B2 | 11/2011 | Cale et al. |
| 8,755,654 B1 | 6/2014 | Danley et al. |

(Continued)

FOREIGN PATENT DOCUMENTS

| EP | 1228834 A1 | 8/2002 |
| WO | 03092890 A2 | 11/2003 |
| WO | 2014/001716 | * 1/2014 |

OTHER PUBLICATIONS

Maezono et al; "Damage Threshold of Acrylic Polymer Jackets Surrounded With Optical Fiber by UV Laser," Proc. SPIE vol. 6346, XVI, International Symposium on Gas Flow, Chemical Lasers, and High-Power Lasers, (2007).

(Continued)

*Primary Examiner* — Mathieu Vargot
(74) *Attorney, Agent, or Firm* — Adam R. Weeks

(57) ABSTRACT

Systems and methods for multiple-pass stripping of an optical fiber are disclosed. The method include irradiating a first portion of the coating with a first beam of radiation having a wavelength at which the coating is substantially transparent and an intensity that exceeds the optical-damage threshold of the coating to form a first damaged coating portion. The method also includes receiving at least a portion of the first radiation beam and redirecting it as a one or more redirected radiation beam to either the first portion of the coating to assist in forming the first damaged coating portion, or to one or more second portions of the coating to form one or more second damaged coating portions. The method additionally includes exposing a section of the central glass portion damaged portions of the coating.

20 Claims, 13 Drawing Sheets

(56) References Cited

U.S. PATENT DOCUMENTS

| | | |
|---|---|---|
| 2006/0089455 A1 | 4/2006 | Sterin et al. |
| 2010/0126665 A1 | 5/2010 | Cale et al. |
| 2012/0135177 A1* | 5/2012 | Cornejo .................. B26F 3/002 428/43 |
| 2013/0270234 A1 | 10/2013 | Thomas et al. |
| 2015/0162728 A1 | 6/2015 | Dietrich et al. |

OTHER PUBLICATIONS

Manenkov et al; "Mechanism of the Accumulation Effect in Laser Damage Due to Polymers: Appearance of Microdamage Due to an Ionization Absorption Wave"; Soviet Journal of Quantum Electronics, American Institute of Physics, New York, NY; vol. 14, No. 4, Apr. 1, 1984.

Manenkov et al; "Role of Absorbing Defects in Laser Damage to Transparent Polymers"; Soviet Journal of Quantum Electronics; vol. 10, No. 3, Mar. 31, 1980.

Ogura et al; "Laser Stripping of Optical Fibers Opens Up New Applications," Laser Focus World, vol. 37, N 6, p. 169-171 (2001).

OPTEK—Laser Strip, webpage. Retireved on May 14, 2016. http://www.opteksystems.com/production-equipment/fiber-processing-machine-tools/laser-strip/.

Rizvi, "Excimer lasers machine novel microstructures" Laser Focus Word, 2000, 5 pgs.

Snelling et al; "Polymer Jacket Stripping of Optical Fibres by Laser Irradiation", Appl. Phys. A, V 79, N 4-6, p. 937-940, (2004).

Villafranca et al. "Polarization dependent femtosecond laser ablation of PMMA—role of light-plasma interaction" CLEO 2012 Conference. 2 pgs.

Zyung et al; "Ultrafast Imaging of 0.532-[MU]Lasaer Ablation of Polymers: Time Evolution of Surface Damage and Blast Wave Generation"; Journal of Applied Physics; vol. 65, No. 12, Jan. 1, 1989.

\* cited by examiner

SYSTEMS AND METHODS FOR MULTIPLE-PASS STRIPPING OF AN OPTICAL FIBER COATING

CROSS-REFERENCE TO RELATED APPLICATIONS

This Application is related to U.S. Provisional Patent Application No. 62/076,503, filed on Nov. 7, 2014, and entitled "Methods for stripping an optical fiber coating using blue or blue-violet radiation," which is incorporated by reference herein.

FIELD

The present disclosure relates to optical fibers, and in particular to systems and methods for multiple-pass stripping the coating of an optical fiber.

BACKGROUND

Optical fibers are a type of optical waveguide that include a core, a cladding that surrounds the core, and a protective coating that surrounds the cladding. The protective coating is typically made of a polymer (e.g., a UV-cured acrylate), while the core and cladding are typically made of glass.

Optical fibers are used in a variety of applications that require terminating an end of the fiber, e.g., with an optical fiber connector. This requires among other things stripping away a portion of the protective coating to leave a bare portion of the optical fiber.

One method of stripping the coating from an optical fiber uses a tool that mechanically contacts the optical fiber. While mechanical stripping tools can be made compact for field deployment and can be low cost, they tend to damage and weaken the resulting bare fiber section.

To avoid such damage, non-contact stripping techniques have been developed. These include hot-nitrogen-jet, plasma, and laser-based techniques. Laser-based stripping techniques have the advantage of providing precise coating removal without mechanical damage. One type of laser-based stripping is performed using a $CO_2$ laser, wherein the coating absorbs the infrared wavelength of the $CO_2$ laser beam. The absorption causes the coating to heat up and then disintegrate. Unfortunately, the equipment for laser-based stripping tools has to date not been amenable to field deployment because of limitations in cost, size, weight and power consumption.

SUMMARY

An aspect of the disclosure is a method of stripping a coating from an optical fiber, wherein the coating has an optical-damage threshold and surrounds a central glass portion of the optical fiber. The method includes: a) irradiating a first portion of the coating with a first beam of radiation having a wavelength at which the coating is substantially transparent and an intensity that exceeds the optical-damage threshold of the coating to form a first damaged coating portion; b) receiving at least a portion of the first radiation beam and redirecting it as a one or more redirected radiation beam to either i) the first portion of the coating to assist in forming the first damaged coating portion, or ii) to one or more second portions of the coating to form one or more second damaged coating portions; and c) exposing a section of the central glass portion by removing either i) the first damaged coating portion or ii) the first damaged coating portion and the one or more second damaged coating portions.

Another aspect of the disclosure is a method of processing an optical fiber having a central glass portion defined by a core and a cladding and by a coating surrounding the central glass portion that is transparent to a processing wavelength and that has an optical-damage threshold intensity at the processing wavelength. The method includes: a) irradiating a first portion of the coating with a first radiation beam having the processing wavelength in the range from 270 nm to 445 nm, and having an intensity greater than the optical-damage threshold intensity to create a first damaged coating portion; b) using a radiation-redirecting device, receiving a portion of the first radiation beam and redirecting it to at least a second portion of the coating as a second radiation beam that has an intensity greater than the optical-damage threshold intensity to create at least a second damaged coating portion; and c) removing the first and the at least second damaged coating portions from the central glass portion.

Another aspect of the disclosure is a system for performing non-contact stripping an optical fiber. The system includes: a radiation source that generates a first radiation beam at a processing wavelength in the range from 270 nm to 445 nm; a radiation-redirecting device having an interior, a central axis and at least one reflective surface, and configured to receive at least a portion of the first radiation beam and form therefrom at least one second radiation beam that is directed to the central axis; the optical fiber arranged with its centerline along the central axis, the optical fiber having a central glass portion and a coating surround the central glass portion, wherein the coating is transparent to a processing wavelength and has an optical-damage threshold intensity at the processing wavelength; wherein the first radiation beam has a first intensity greater than the optical-damage threshold intensity and is directed at a first portion of the coating of the optical fiber; and wherein the at least one second radiation beam has a second intensity greater than the optical-damage threshold intensity and is directed to either the first portion of the coating of the optical fiber or a second portion of the coating of the optical fiber.

In various examples, the radiation-redirecting device comprises a reflector having one or more reflecting surfaces, which in one example can be planar facets or sections while in another example can be curved sections. In an example, the reflector has a cylindrical shape.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate various embodiments and together with the Detailed Description serve to explain principles and operation of the various embodiments. As such, the disclosure will become more fully understood from the following Detailed Description, taken in conjunction with the accompanying Figures, in which:

FIGS. 14A and 14B are schematic diagrams of examples of the optical system of FIGS. 13A and 13B, wherein FIG. 14A shows the helical-like optical path of the radiation beam and where FIG. 14B shows the focus positions closely spaced along the length of the optical fiber;

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

Cartesian coordinates are shown in some of the Figures for the sake of reference and are not intended to be limiting as to direction or orientation.

Coated Optical Fiber

Figure 1:
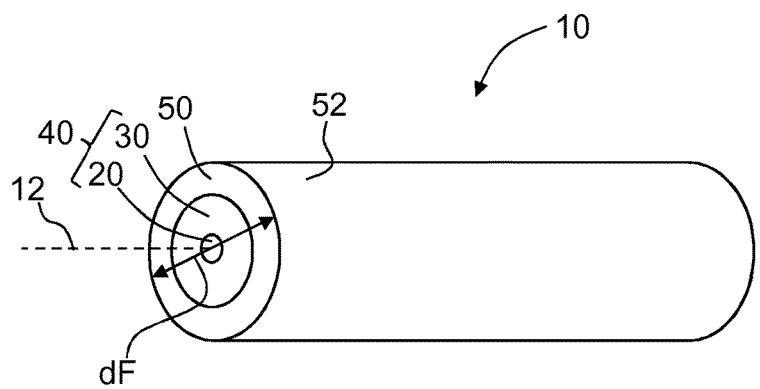
FIG. 1 is a front elevated view of an example optical fiber to be processed using the systems and methods disclosed herein, illustrating the arrangement of the core, cladding and coating.

FIG. 1 is a front elevated view of an example optical fiber 10 to be processed using the systems and methods disclosed herein. The optical fiber 10 has a centerline 12, a core region ("core") 20 arranged along the centerline, an annular cladding region ("cladding") 30 that surrounds the core, and an annular coating 50 that surrounds the cladding and defines an outer surface 52 of the optical fiber. The core 20 and cladding 30 are typically made of glass while coating 50 is typically made of a polymer, such as acrylate. In an example, coating 50 is generally transparent to visible radiation, down to wavelengths of about 200 nm. The coating 50 has an optical-damage threshold, which is also referred to herein as an optical-damage threshold intensity since the optical-damage threshold can be measured in units of intensity (i.e., optical power per unit area).

The optical fiber 10 has a diameter dF that is a measure of the outside diameter of coating 50. The diameter dF may be, for example, nominally 250 µm, or 0.25 mm. The optical fiber 10 can have any reasonable diameter dF consistent with single-mode or multimode operation.

The core 20 and cladding 30 define a central glass portion 40 of optical fiber 10, with coating 50 surrounding the central glass portion. The central glass portion 40 without coating 50 is referred to herein as a "bare section" or "stripped section" 42 of optical fiber 10 (see, e.g., FIG. 5).

Optical Fiber System for Non-Contact Stripping

Figure 2A:
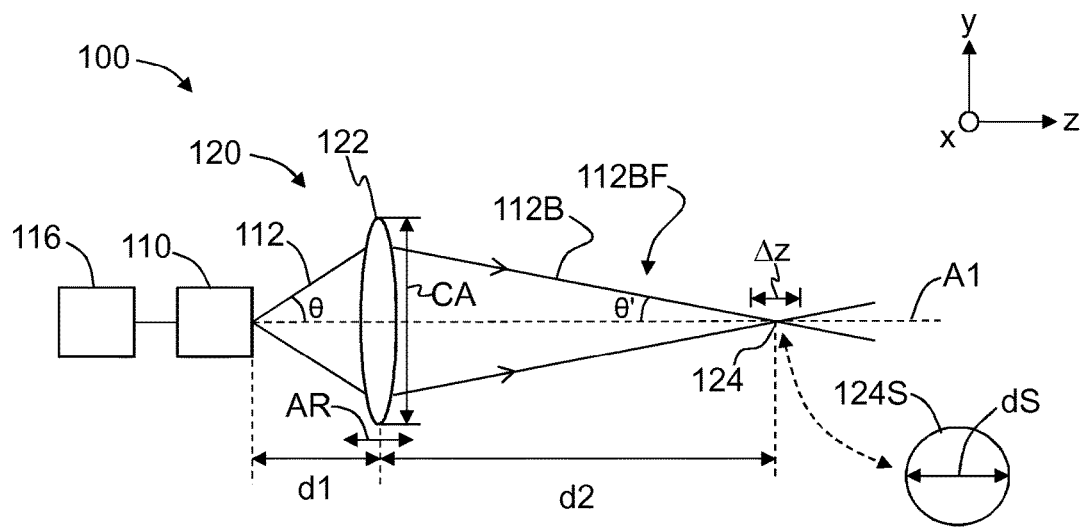
FIG. 2A is a schematic diagram of an example optical system used to carry out the non-contact stripping methods for stripping a portion of the coating disclosed herein.

FIG. 2A is a schematic diagram of an example optical system 100 used to carry out the non-contact stripping methods disclosed herein. The optical system 100 has an optical axis A1, which runs in the z-direction. The optical system 100 includes a radiation source 110 along optical axis A1 that emits radiation 112 at a divergence angle θ measured relative to the optical axis. The radiation 112 has a wavelength λ, which is referred to herein as the "processing wavelength." In an example, processing wavelength λ is in the wavelength range from 380 nm to 490 nm and in another example is in the wavelength range from 400 nm to 460 nm.

In another example, the processing wavelength λ is in the range from 270 nm to 1100 nm or 270 nm to 445 nm. In an example, radiation source 110 comprises a diode laser that emits radiation 112 at a processing wavelength within the 270 nm to 1100 nm range. By way of example, for an example coating 50 made of acrylate, about 17.6 W of optical power is required for a processing wavelength λ of 405 nm, 9.6 W of optical power is required for a processing wavelength λ of 380 nm, and 1.9 W of optical power is required for a processing wavelength λ of 294 nm.

In an example, coating 50 is substantially transparent to radiation 112 having processing wavelength λ. Here, the term "substantially transparent" with respect to coating 50 and processing wavelength λ means that the amount of absorption in the coating at the processing wavelength is not sufficient to heat the (undamaged) coating to the point where the coating is removed from central glass portion 40.

In an example, radiation source 110 includes or consists of a 405-nm blue-violet diode laser (i.e., λ=405 nm), which is widely used in Blu-ray Disc™ players. Such diode lasers operate in single mode and thus emit a Gaussian beam having excellent beam quality. Another example radiation source 110 includes or consists of a blue diode laser that emits radiation at a nominal processing wavelength λ=445 nm. In an example, radiation source 110 is operably attached to a portable power supply 116, which in an example is or includes one or more batteries.

Generally speaking, radiation source 110 can be any radiation source that emits radiation 112 at a nominal processing wavelength λ of either 405 nm or 445 nm, and that provides sufficient optical power to carry out the optical fiber stripping methods disclosed herein while allowing optical system 100 to be sufficiently compact to be readily deployed and used in the field.

The optical system 100 also includes a focusing optical system 120 arranged along optical axis A1 optically downstream from radiation source 110. The focusing optical system 120 includes one or more optical elements 122 configured to receive radiation 112 from radiation source 110 and form therefrom a radiation beam 112B. In an example, radiation beam 112B has a focus position 124 along axis A1 and an associated convergence angle θ' measured relative to optical axis A1. The one or more optical elements 122 can include lenses, mirrors, apertures, gratings, fibers, beamsplitters, filters, attenuators, polarizers, etc. In an example, the one or more optical elements 122 consist of a single refractive element, such as an aspheric lens element or aspheric mirror element. In an example, the single refractive element includes an antireflection coating. An example material for a single aspheric refractive element is ECO-550 glass, which can be molded into a suitable aspheric shape. In an example, at least one of the one or more optical elements 122 of focusing optical system 120 is movable (e.g., axially movable, as indicated by arrow AR) to adjust focus position 124 and convergence angle θ'.

The optical system 100 of FIG. 2A shows a single optical element 122 by way of example, wherein the single optical element resides a distance d1 away from radiation source 110 and a distance d2 from focus position 124. The radiation beam 112B constitutes a focused radiation beam 112BF that forms a focus spot 124S in the x-y plane at focus position 124, the focus spot having a diameter dS at focus position 124. In an example, diameter dS of focus spot 124S is in the range from 5 μm to 20 μm. In an example, focus spot 124S resides within a depth of focus Δz associated with focused radiation beam 112BF, where focus position 124 is at the center of the depth of focus. The diameter dS of focus spot 124S can be well approximated by the size of the aberration-free airy disk, i.e., $dS \approx 1.22\lambda/NA$, where NA is the numerical aperture and is given by $NA = n \cdot \sin\theta'$, where n=1 for air in most instances. For a diameter dS of 20 μm and a processing wavelength λ=405 nm, the numerical aperture NA≈0.025. The clear aperture CA is the diameter of focusing optical system 120 (e.g., of optical element 122) and in an example is in the range 2 mm≤CA≤12 mm.

Figure 2B:
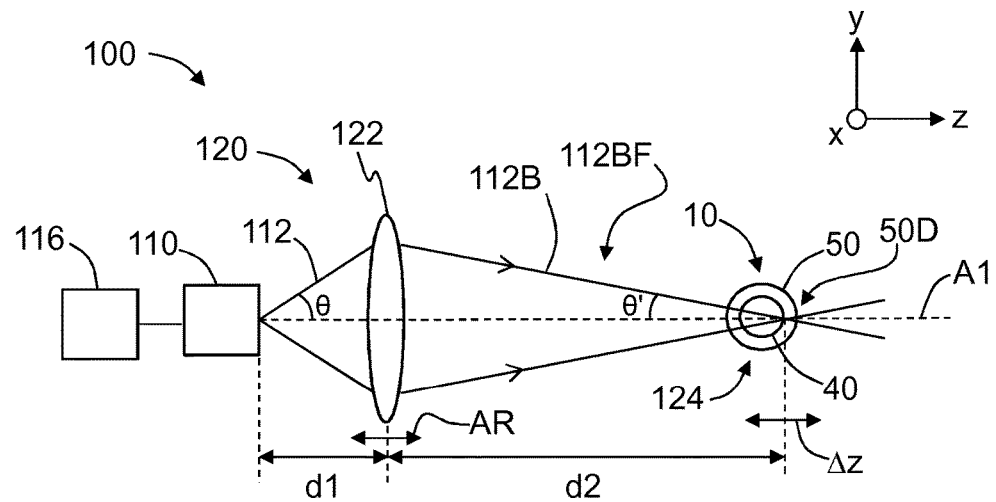
FIG. 2B is similar to FIG. 2A and further includes the optical fiber being processed while the optical system is in a focused configuration.
Figure 3:
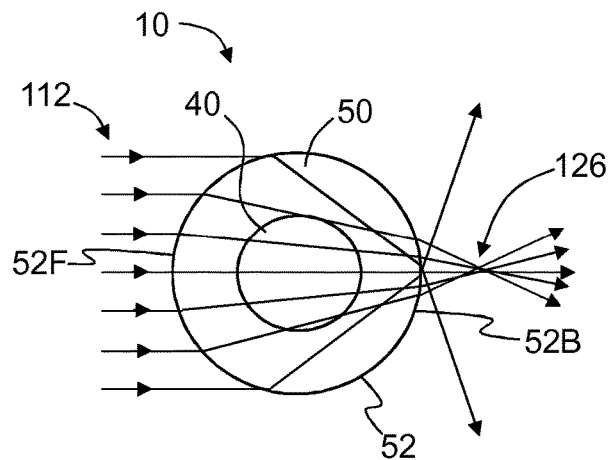
FIG. 3 is a close-up cross-sectional view of the optical fiber illustrating how collimated radiation is concentrated within the coating layer and brought to a loose focus just beyond the back side of the outer surface of the coating.

FIG. 2B is similar to FIG. 2A, and includes optical fiber 10 arranged substantially at focus position 124 (e.g., within the depth of focus Δz), with centerline 12 of the optical fiber arranged along the x-direction. Because optical fiber 10 has a relatively small diameter (e.g., 250 microns or 0.25 mm), the optical fiber acts as a strong cylindrical lens. FIG. 3 is a close-up cross-sectional view of optical fiber 10 showing collimated radiation rays 112 (or "radiation beam 112" or simply "radiation 112") incident upon the optical fiber on a front side 52F of outer surface 52. The radiation rays 112 are focused by the curved outer surface 52 and are concentrated within coating 50 and brought to a loose focus 126 just beyond a back side 52B of the outer surface.

For a convergent or focused radiation beam 112BF such as is shown in FIG. 2B, radiation rays 112 are even more concentrated, and loose focus 126 can be formed within coating 50. The greater the concentration of radiation rays 112, the greater the intensity of radiation. In an example, the radiation intensity in radiation beam 112B at back side 52B of optical fiber 10 is about three times greater than that at front side 52F. In an example, the intensity of focused radiation beam 112BF over at least a portion of the depth of focus Δz exceeds the optical-damage threshold intensity for coating 50.

Figure 2C:
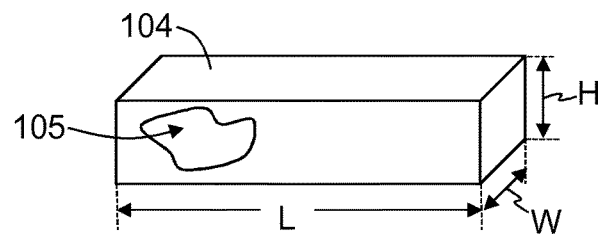
FIG. 2C shows an example housing for the optical system and shows length, width and height dimensions, which in an example are selected such that the optical system is compact, e.g., small enough to be handheld.

In an example illustrated in FIG. 2C, optical system 100 is contained within an interior 105 of a housing 104. In an example, housing 104 is sized to be compact, e.g., small enough to be handheld. The housing 104 is shown by way of example as being generally rectangular and having a length L, a width W, a height H and a volume V=L×W×H. Example dimensions for housing 104 are 50 mm≤L≤150 mm; 30 mm≤W≤75 mm; and 12 mm≤H≤25 mm. An example range of the volume V of housing 104 is 15 cm³≤V≤60 cm³.

A blue-violet diode laser has an output power of about 700 mW and an operating wavelength of λ=405 nm. It is noted here that coating 50 is transparent to this wavelength of radiation. However, as discussed above, coating 50 has an optical-damage threshold (which can be expressed in units of optical intensity) that is typically no greater than about 2 MW/cm² at 405 nm or 455 nm. An intensity that exceeds this damage threshold can be generated by optical system 100 by making the focus spot diameter dS (see FIG. 1) about 20 microns. Moreover, nonlinear effects in coating 50 can increase the absorption and raise the temperature of the coating, and reduce the optical-damage threshold intensity of the coating.

Thus, with continuing reference to FIG. 2B, radiation beam 112B is formed as a focused radiation beam 112BF such that radiation 112 that irradiates coating 50 of optical fiber 10 has an intensity that exceeds the optical-damage threshold of the coating. This results in localized damage of coating 50, i.e., a damaged coating portion 50D.

The configuration of optical system 100 shown in FIG. 2B wherein radiation beam 112B forms a focused radiation beam 112BF having the focus position 124, which is within or very close to coating 50 is referred to as the "focused configuration." In an example, the focused configuration is defined by optical fiber 10 being within the depth of focus Δz, with focused radiation beam 112BF having an intensity that exceeds the optical-damage threshold of coating 50 over at least a portion of the depth of focus, and in one example over the entire depth of focus.

Figure 4:
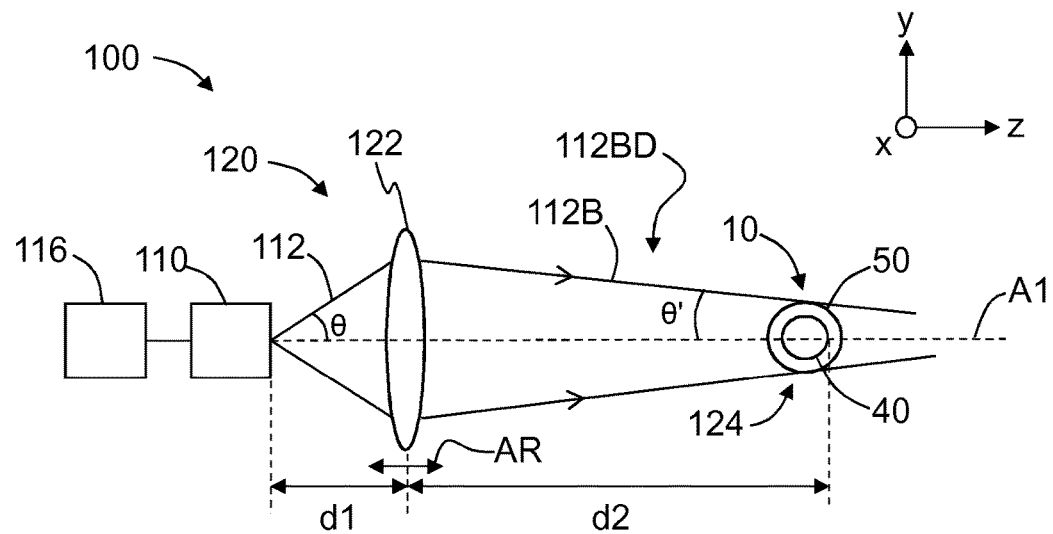
FIG. 4 is similar to FIG. 2B and shows the optical fiber being processed while the optical system is in a defocused configuration.

Once damaged coating portion 50D is formed, then with reference to FIG. 4, optical system 100 can be adjusted to have a "defocused configuration," wherein radiation beam 112B constitutes a defocused radiation beam 112BD that is less concentrated than focused radiation beam 112BF so that it irradiates the entire diameter dF of optical fiber 10. In an example, this adjustment of optical system 100 is accomplished by changing the distance d1 between radiation source 110 and focusing optical system 120. This change in distance d1 can be accomplished by axially moving focusing optical system 120, or at least one of the one or more optical elements 112 therein, or by moving radiation source 110. In an example, the defocused configuration is defined by optical fiber 10 no longer being within the depth of focus Δz. Also in an example, the intensity of defocused radiation beam 112BD at the location of optical fiber 10 is less than the optical-damage threshold intensity of coating 50.

Figure 5:
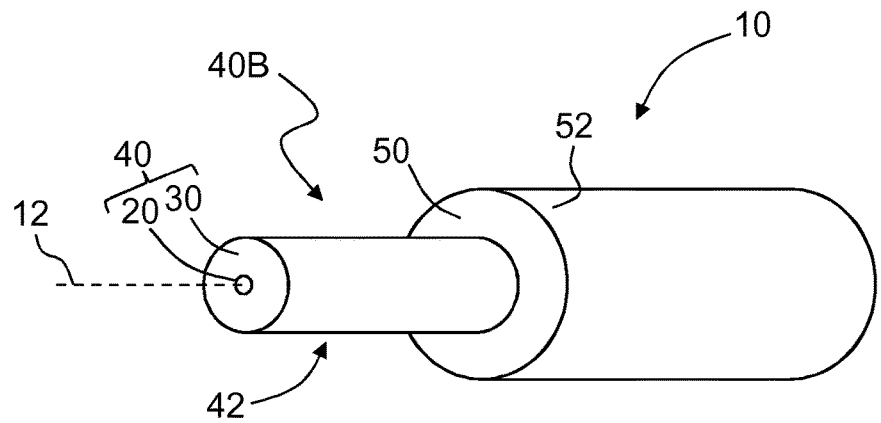
FIG. 5 is similar to FIG. 1 and shows a portion of the coating stripped from the optical fiber and the resulting stripped-fiber section or bare-fiber section.

The damaged coating portion 50D has an increased absorption at the operating wavelength λ of radiation 112. This causes a rapid increase in temperature upon continued irradiation, which leads to the burning and decomposition of the material of coating 50. In an example, focused laser beam 112BF of the focused configuration is used to form damaged coating portion 50D of a select size, and then defocused laser beam 112BD of the defocused configuration is scanned over the damaged coating portion to remove it from central glass portion 40 of optical fiber 10. This exposes a bare section or stripped section 42, as shown in FIG. 5. In an example, multiple scan passes of radiation beam 112B (in either the focused or defocused form 112BF or 112BD) can be used to remove any residual material of coating 50.

In an example, the stripping process can include adjusting optical system 100 back and forth between the focused and defocused configurations, and moving radiation beam 112B for each of these configurations relative to coating 50 as needed to carry out the stripping operation.

In another example, optical system 100 is operated only in the defocused configuration with a longer dwell time of defocused radiation beam 112BD on coating 50 to define damaged coating portion 50D, after which scanning of the (defocused) radiation beam relative to optical fiber 10 to remove the damaged portion of the coating is initiated.

Multiple Optical Systems

Figure 6A:
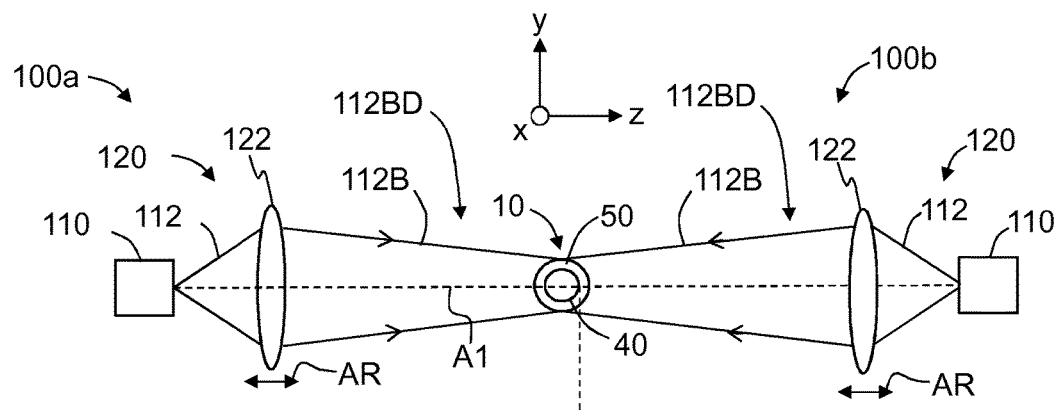
FIGS. 6A through 6D are schematic diagrams that illustrate example optical system configurations for performing the non-contact stripping methods disclosed herein.
Figure 6B:
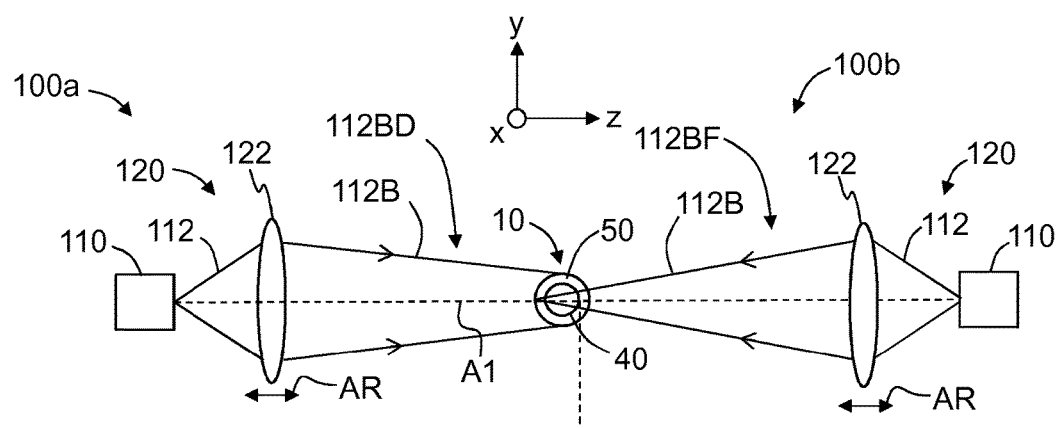
Figure 6C:
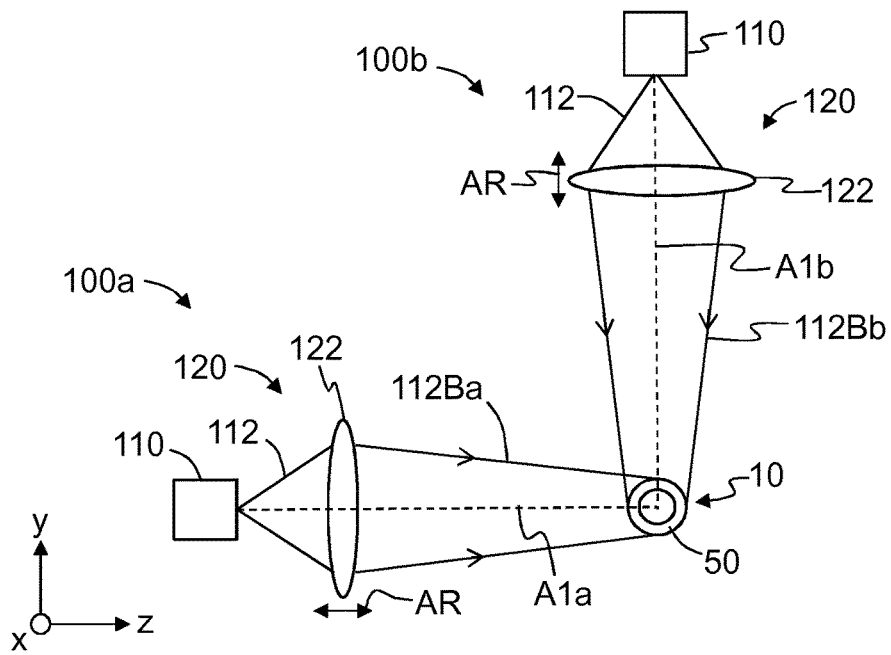

FIGS. 6A and 6B illustrate example embodiments wherein coating 50 of optical fiber 10 is irradiated by multiple (e.g., two) optical systems 100, denoted 100a and 100b. In FIG. 6A, the two optical systems 100a and 100b are shown in the defocused configuration. In FIG. 6B, optical system 100a is in the defocused configuration, while optical system 100b is in the focused configuration. In the example of FIG. 6B, optical system 100b is used to provide the higher intensity of radiation 112 at coating 50 to more quickly form damaged coating portion 50D in the coating, while optical system 100a provides the lower intensity but greater spatial coverage to remove the damaged coating portion. FIG. 6C is similar to FIG. 6B and shows the two optical systems 100a and 100b having respective optical axes A1a and A1b, which are arranged so that optical fiber 10 is irradiated by the respective radiation beams 112Ba and 112Bb at a right angle to each other.

Figure 6D:
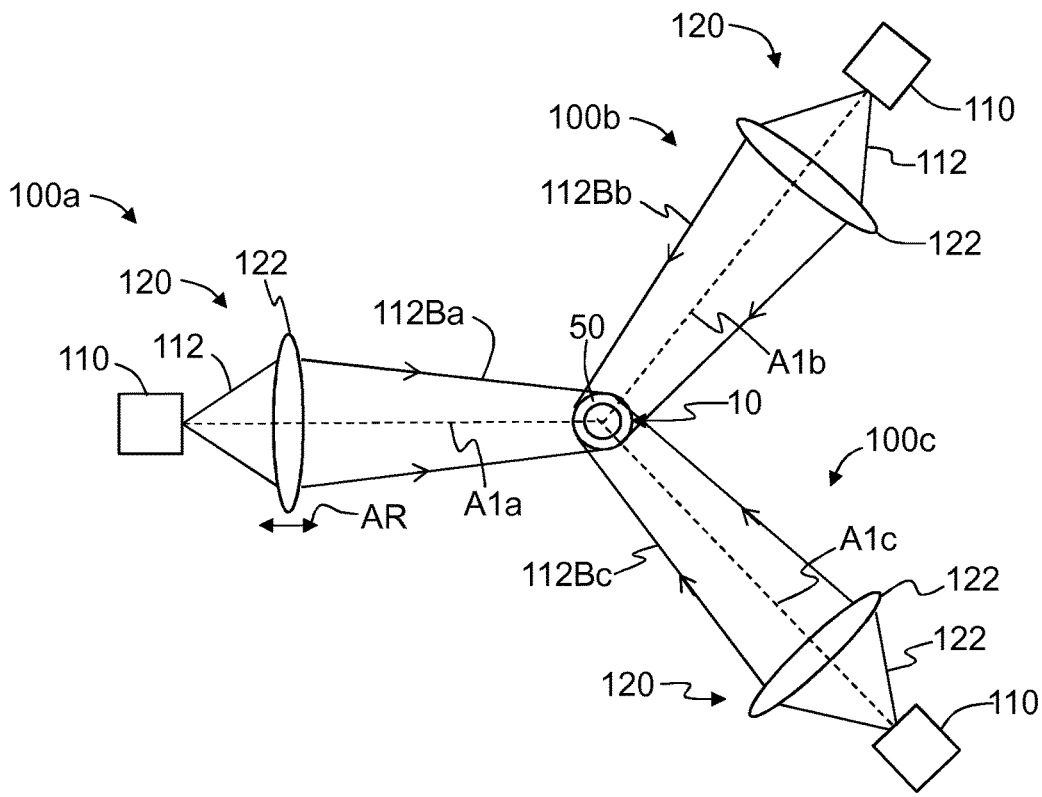

In other embodiments, the two or more optical systems 100 can also be arranged so that their respective optical axes define convenient irradiation angles. FIG. 6D illustrates an example that utilizes three optical systems 100, denoted 100a, 100b and 100c, with the three optical systems having respective optical axes A1a, A1b, A1c and respective radiation beams 112Ba, 112Bb and 112Bc. The optical axes A1a, A1b and AR are arranged about 120 degrees apart and intersect substantially at optical fiber 10. In other embodiments using multiple optical systems 100, the angular separations of the optical systems need not be the same.

In an example, one or more of the multiple optical systems 100 can operated so that focused radiation beam 112BF is scanned over a portion of optical fiber 10 as discussed above to define damaged coating portion 50D and then to define the exposed central glass portion 40 of the optical fiber as bare section or stripped section 42, as shown in FIG. 5.

Optical Fiber Holder

Figure 7A:
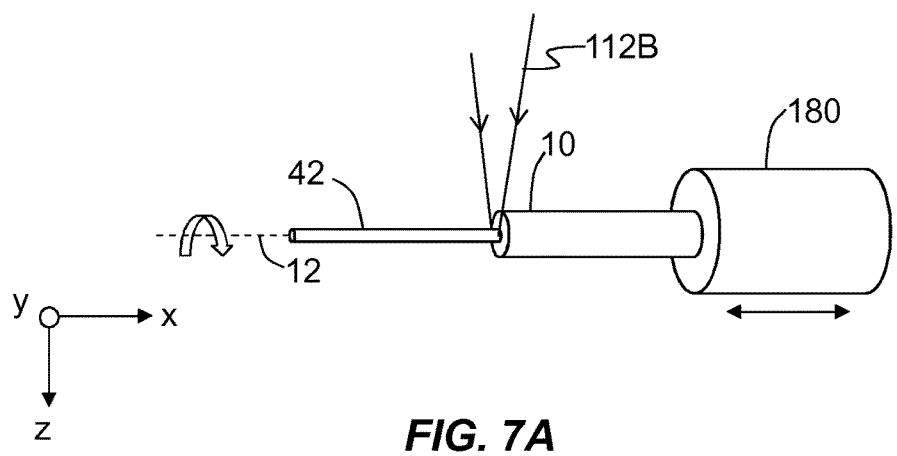
FIG. 7A is a front elevated view of an example optical fiber holder used to hold the optical fiber and also to rotate and translate the optical fiber.
Figure 7B:
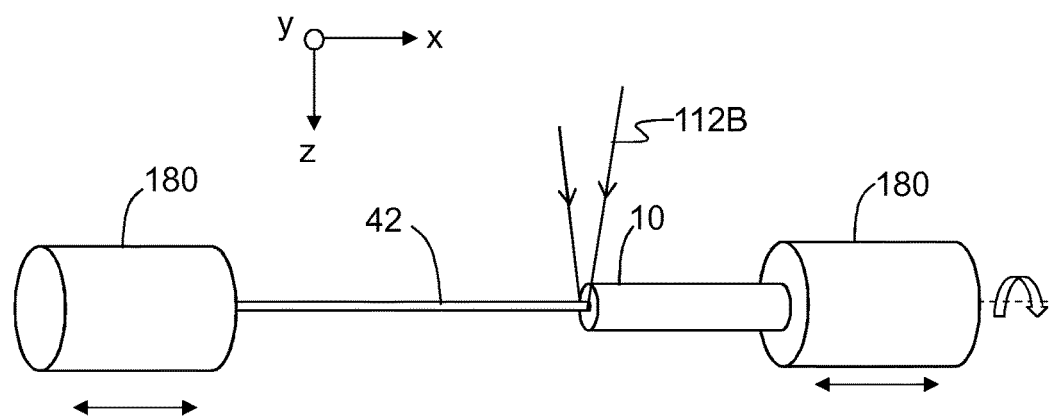
FIG. 7B is similar to FIG. 7A and illustrates an example embodiment where the optical fiber holder is configured to hold the optical fiber under tension.

FIG. 7A illustrates an embodiment wherein optical fiber 10 is held by an optical fiber holder 180. In an example, the optical fiber holder 180 is configured to rotate optical fiber 10 about its centerline 12, and can also optionally axially translate the optical fiber, i.e., along the optical fiber centerline. This allows for radiation beam 112B to irradiate different portions of coating 50 about the circumference of outer surface 52 for a given x-position, as well as to irradiate different portions of the coating along the length of the optical fiber (i.e., the x-direction). FIG. 7B is similar to FIG. 7A and illustrates an example wherein optical fiber 10 is held at both ends by optical fiber holder 180 to provide a degree of axial tension.

In an example, coating 50 is processed in a clean condition. In another example, coating 50 can be provided with at least one material that decreases the damage threshold of the coating or that otherwise facilitates the removal of the coating when the coating is irradiated by radiation beam 112B. In an example, the material provided to coating 50 can be what is normally considered a contaminant, such as oil, dirt, debris, etc., that increases the absorption of radiation 112. In an example, the contaminants can be provided simply by way of a person touching coating 50 with his or her hands.

Polarizer and Scanning Optical Elements

Figure 8:
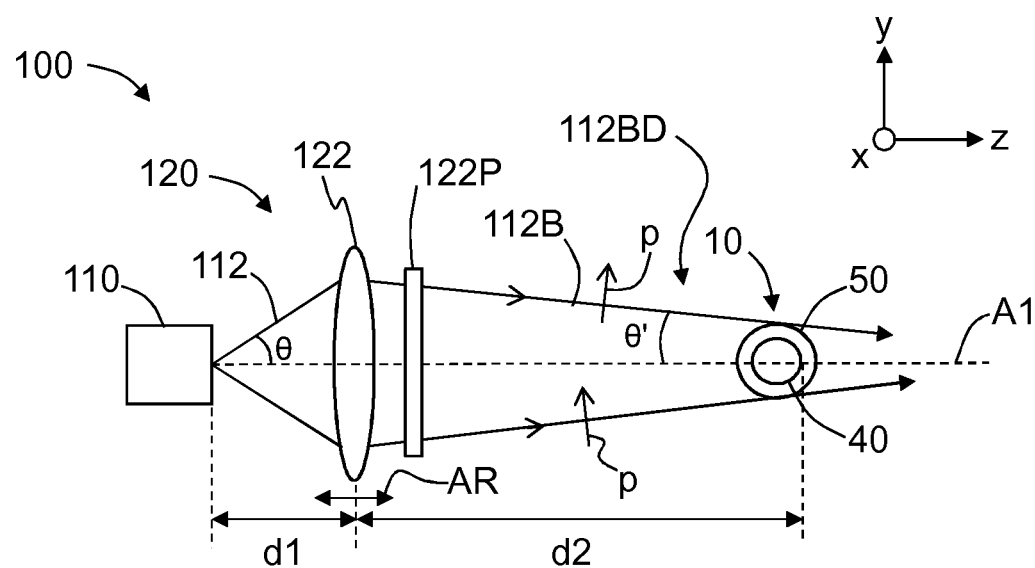
FIG. 8 is similar to FIG. 4 and illustrates an example embodiment wherein the optical system includes a polarizer to define a p-polarized radiation beam.

In an example embodiment illustrated in FIG. 8, one of the optical elements 122 of focusing optical system 120 is or includes a polarizer 122P that defines a polarization p for radiation beam 112B. In an example, polarization p is the p-polarization, which is perpendicular to the length (x-direction) of optical fiber 10 to optimize transmission of radiation 112 into coating 50.

Figure 9A:
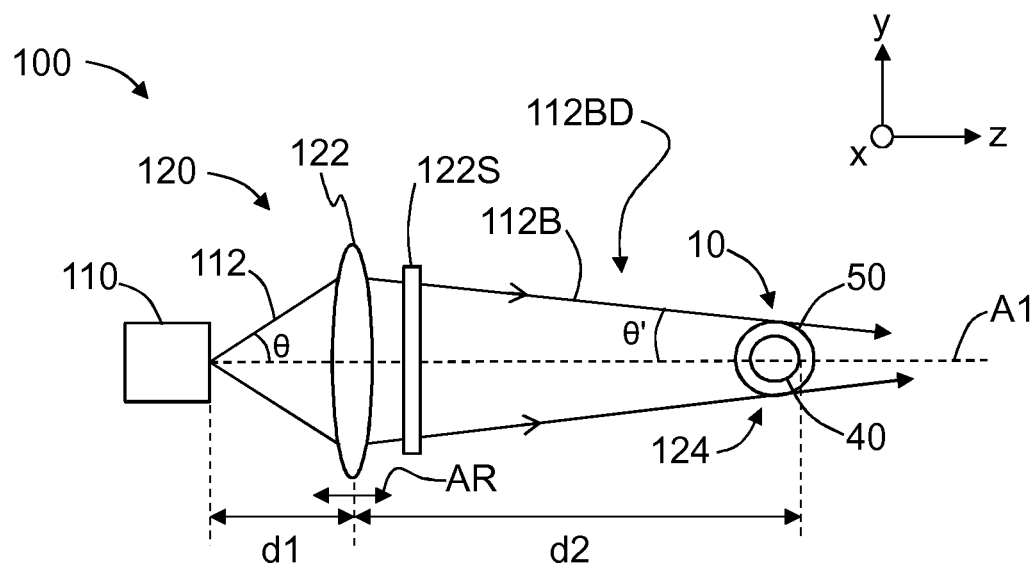
FIGS. 9A and 9B are schematic diagrams of an example optical system that includes a scanning element for scanning the radiation beam along the length of the optical fiber as well as laterally across the optical fiber.
Figure 9B:
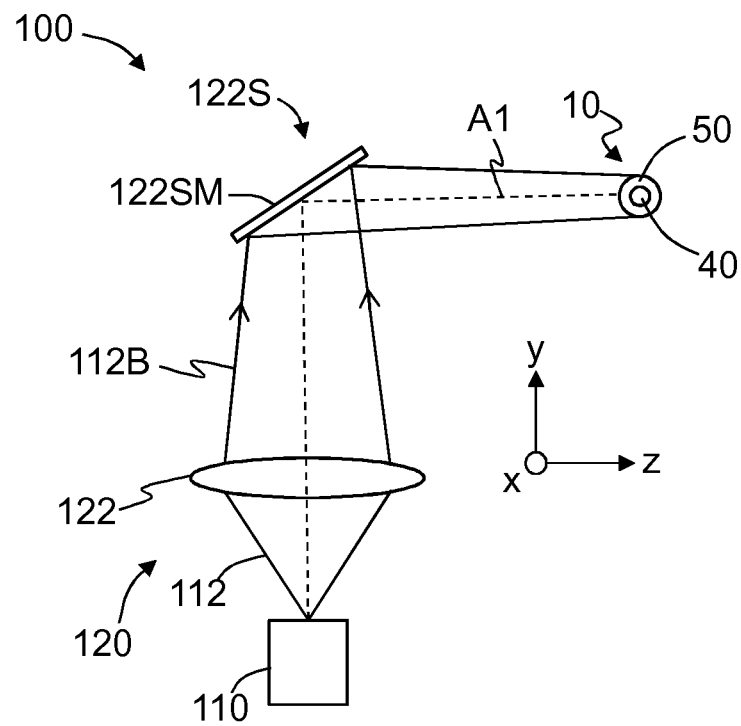

In another example illustrated in FIGS. 9A and 9B, one of the optical elements 122 of focusing optical system 120 is or includes a scanning element 122S that allows for radiation beam 112B to scan over coating 50. FIG. 9B shows an example scanning element 122S in the form of a scanning mirror 122SM that is configured to direct radiation beam 112B in the x-direction, i.e., to scan the radiation beam along a select length of optical fiber 10 (e.g., by rotation of the scanning element about the y-axis). The scanning element 122S can also be optionally scanned in the y-direction (e.g., by rotation of the scanning element about the x-axis) in the case wherein radiation beam 112B is a tightly focused radiation beam 112BF and does not cover the entire diameter of outer surface 52 of coating 50 in the lateral direction (i.e., the y-direction). The embodiment of optical system 100 of FIGS. 9A and 9B can be used in combination with moving optical fiber 10, i.e., performing at least one of axial translation and a rotation of the optical fiber using, for example, optical fiber holders 180 of FIGS. 7A and 7B.

Radiation-Redirecting Device

An aspect of the disclosure includes embodiments of optical system 100 wherein the optical system is configured to make efficient use of radiation beam 112B by receiving light that passes through or around optical fiber 10 or that is not otherwise incident directly on the optical fiber and directing it to the optical fiber and particular to coating 50 so that the coating is irradiated multiple times by using multiple "passes" of the radiation. In some examples, the multiple irradiations occur at different locations along optical fiber 10 to define multiple damaged coating portions 50D, while in other examples, multiple irradiations occur at substantially the same location along optical fiber 10 to define one damaged coating portion. The one or more damaged coating portions 50D are then removed from optical fiber 10, e.g., by being subjected to further irradiation at the processing wavelength, as described above. Other means can also be used to remove the damaged coating portion(s) 50D.

Figure 10:
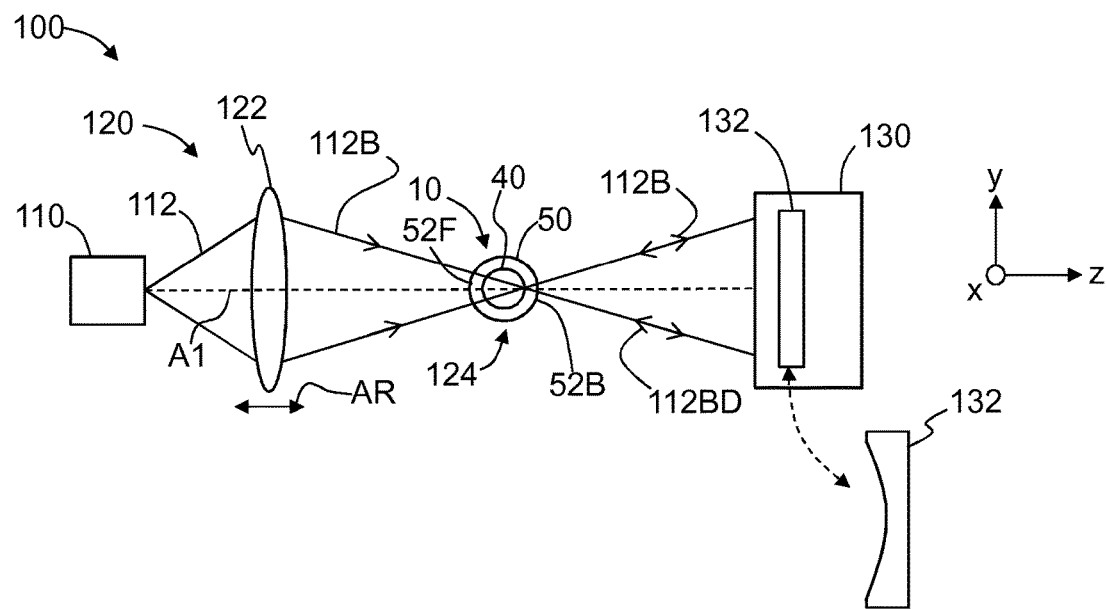
FIG. 10 is similar to FIG. 4 and illustrates an embodiment of the optical system that includes a radiation-redirecting device arranged relative to the optical fiber and configured to receive radiation that passes through or around the coating and direct it back to the coating.

FIG. 10 illustrates an example embodiment of optical system 100, wherein the optical system includes a radiation-redirecting device 130. The radiation-redirecting device 130 can include one or more optical elements or components 132. The radiation-redirecting device 130 is operably disposed relative to optical fiber 10 and is configured to receive radiation 112 from radiation beam 112B that passes through or around optical fiber 10 (or that is not otherwise incident directly on the optical fiber) and direct the radiation to coating 50 as a redirected radiation beam 112BD.

In the example of FIG. 10, radiation-redirecting device 130 is shown as being arranged adjacent back side 52B of outer surface 52 of coating 50. In an example, the radiation-redirecting device 130 includes a reflecting element 132, such as converging mirror or a retro-reflecting mirror (e.g., a retro-reflecting cube) that provides a double-pass configuration whereby coating 50 is irradiated by radiation beam 112B and by redirected radiation beam 112BD. In an example, at least one of the optical systems 100 in a multi-optical-system configuration such as those discussed above uses radiation-redirecting device 130, while in another example, each of the optical systems in a multi-optical-system configuration includes its own radiation-redirecting device.

Figure 11:
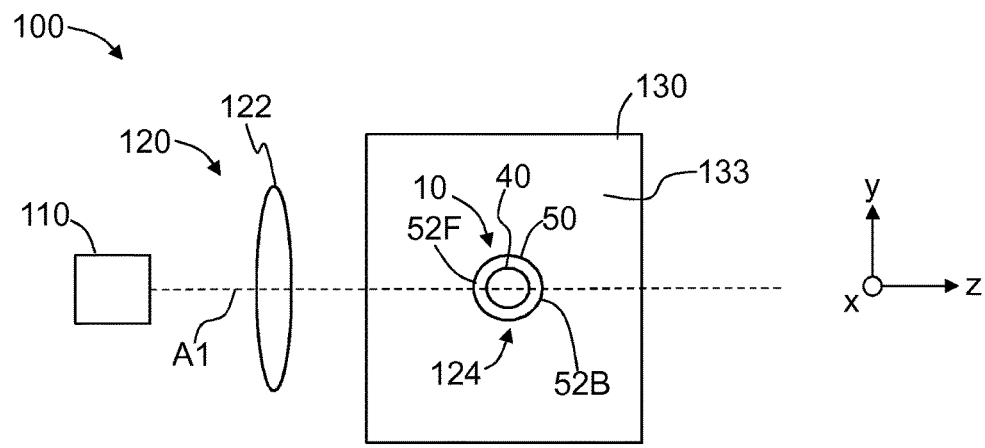
FIG. 11 is a schematic diagram of an example optical system wherein the optical fiber resides within an interior of the radiation-redirecting device.

FIG. 11 shows an example optical system 100 wherein optical fiber 10 resides within an interior 133 of radiation-redirecting device 130. The focusing system 120 of optical system 110 can be adjusted to perform a more general beam-shaping function to shape radiation beam 112B. Further, optical axis A1 need not intersect optical fiber 10. In some examples, radiation beam 112B can be incident upon optical fiber 10 after one or more reflections or beam redirections using radiation-redirecting device 130. Thus, in some examples of optical system 100, focusing system 120 is not required, while in other examples the focusing system is used for beam shaping or beam control. In some examples, radiation-reflecting optical system 130 is configured to perform the focusing function of focusing system 120.

Figure 12A:
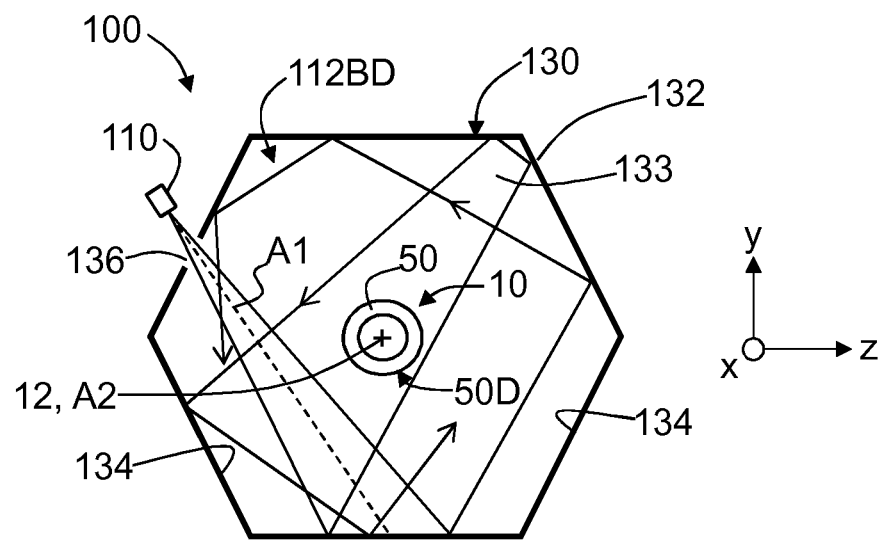
FIG. 12A is a schematic diagram of an example optical system wherein the radiation-redirecting device is in the form of a reflector having a polygonal cross-section.

FIG. 12A is an example embodiment of the configuration of optical system 100 of FIG. 11, wherein radiation-redirecting device 130 includes or consists of a reflector 132 having a central axis A2, a polygonal cross-section, and the aforementioned interior 133 in which resides optical fiber 10. The polygonal reflector 132 includes a reflective inner surface 134 that is segmented, and in the example shown includes six reflective segments or facets. Generally, the reflective inner surface 134 of polygonal reflector 132 is multifaceted and includes three or more reflective segments.

In an example, reflecting surface 134 includes a reflective coating to provide optimized reflectivity at the processing wavelength λ. In an example, an aperture 136 is formed in one of the reflecting surfaces 134 and serves as an entrance point for radiation beam 112B. In the example shown in FIG. 12A, optical fiber 10 resides along central axis A2, i.e., the centerline 12 of the optical fiber coincides with central axis A2.

Figure 12B:
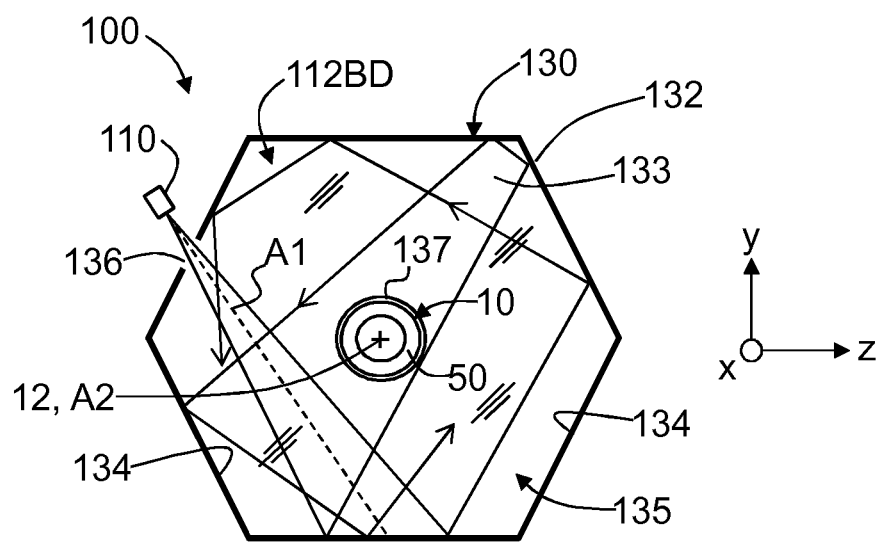
FIG. 12B is similar to FIG. 12A and illustrates an example wherein the reflector includes a solid, transparent material in its interior, and wherein the solid, transparent material includes a central aperture sized to accommodate the optical fiber being processed.

FIG. 12B is similar to FIG. 12A and illustrates an example wherein reflector 132 includes in interior 133 a solid material substantially transparent to the processing wavelength γ. The transparent, solid material 135 includes a central bore 137 formed along the central axis A2, with the central aperture being sized to accommodate and support optical fiber 10. This embodiment provides one way of supporting optical fiber 10 along central axis A2. Other embodiments include using a fiber holder 180 to support optical fiber 10, as described above, In the example shown, optical axis A1 of optical system 100 corresponds with the direction of travel of radiation beam 112B and is offset from optical fiber 10, with the radiation beam being divergent. The radiation beam 112B is directed through aperture 136 and reflects from reflecting surfaces 134 to define redirected radiation beam 112BD, which is substantially trapped within interior 133 for at least multiple reflections and irradiates coating 50 from multiple directions.

The coating 50 is irradiated by radiation beam 112B and redirected radiation beam 112BD to form one or more damaged coating portions (such as damaged coating portion 50D; see FIG. 2B). The one or more damaged coating portions 50D can then be removed (stripped) from optical fiber 10 to expose the underlying central glass portion 40. The optical fiber 10 can be translated in the x-direction to define positions of the one or more damaged coating portions. Once the stripping process is completed, the portion of the optical fiber 10 residing within interior 133 can be removed. In an example, the removal of the one or more damaged coating portions 50D can be accomplished by continuing to irradiate the coating 50 using radiation beam 112B and/or the redirected radiation beam 112BD. Since the one or more damaged coating portions 50D have increased optical absorption, a different wavelength of light other than the processing wavelength can be used. In an example, a different radiation source 110 can be used. Alternatively, it may be convenient to use the same radiation source 110 for forming the one or more damaged coating portions 50D and then further irradiating these portions to remove them from optical fiber 10.

In an example, radiation-redirecting device 130 has a depth in the x-direction that corresponds to the axial length of coating50 to be removed from optical fiber 10. Not shown in the examples of FIGS. 12A and 12B for ease of illustration and discussion is the refraction by coating 50 and central glass portion 40 that substantially redirects incident radiation beam 112B (as well as re-directed radiation 112BD) and distributes it over interior 133.

Figure 13A:
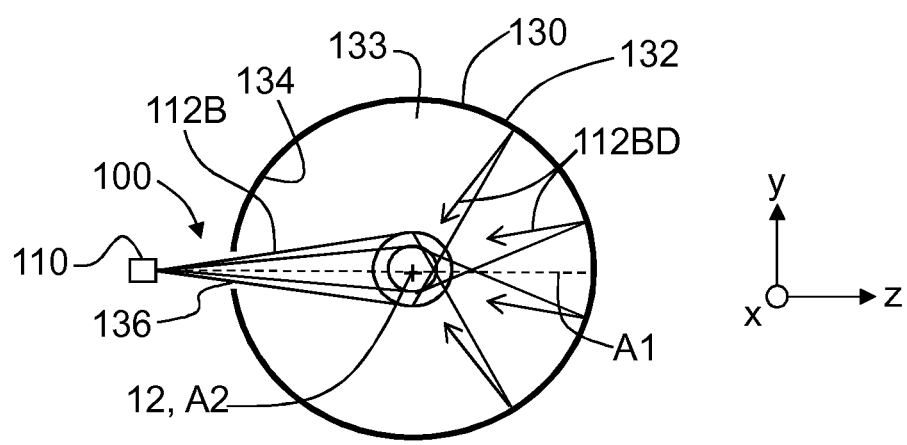
FIGS. 13A and 13B are schematic diagrams of an example optical system wherein the radiation-redirecting device is in the form of a reflector having a round cross-section.
Figure 13B:
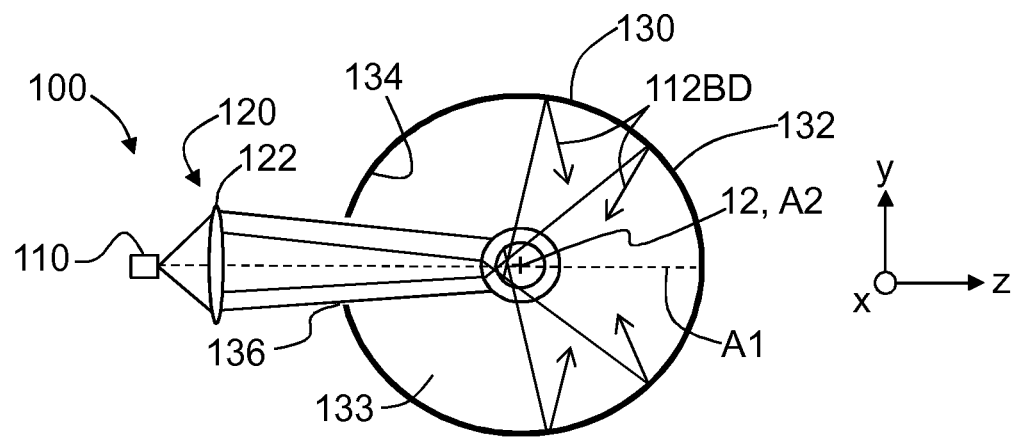

FIG. 13A is similar to FIG. 12A and illustrates an example where radiation-redirecting device 130 includes or consists of a reflector 132 having a round cross-section rather than a polygonal cross-section. The reflector 132 of FIG. 13A is cylindrical and has a single reflective interior surface 134. FIG. 13B is similar to FIG. 13A and includes focusing system 120, which in the example shown is used to form convergent radiation beam 112B. The redirected radiation beams 112BD in the example optical systems 100 of FIGS. 13A and 13B are formed by reflection off of inner surface 134 that directs the radiation back toward the central axis A2 of the reflector 132. In one example, the redirected radiation beam 112BD has sufficient optical power to damage coating 50. In another example, the redirected radiation does not have sufficient optical power to damage coating 50 but has sufficient optical power to remove damaged coating portion 50D formed by the initially incident radiation beam 112B.

Figure 14A:
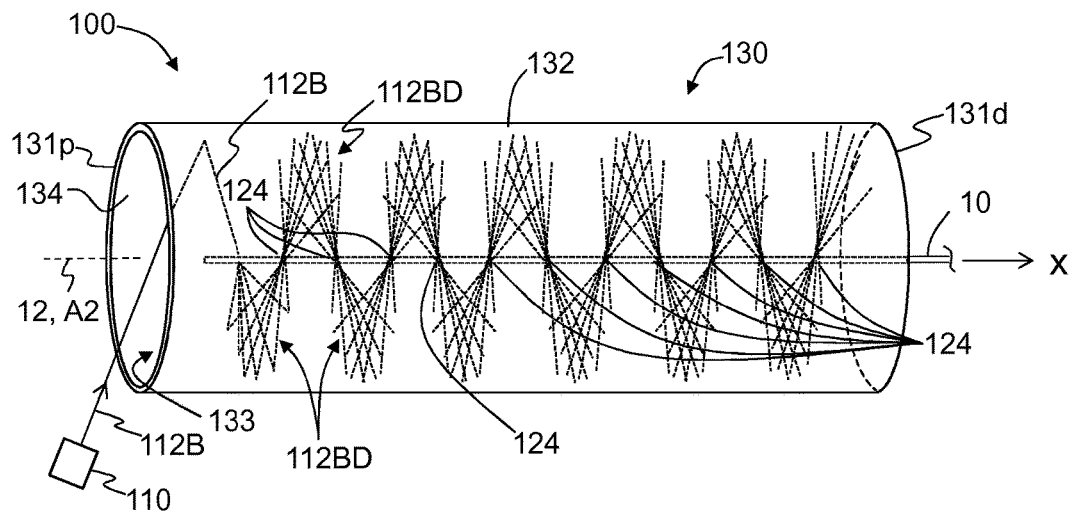
Figure 14B:
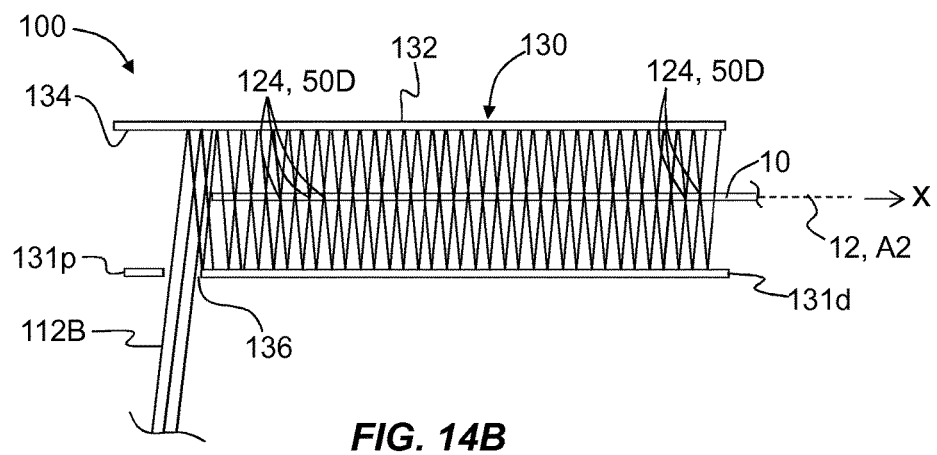

FIGS. 14A and 14B illustrate example optical systems 100 similar to those shown in FIGS. 13A and 13B, wherein the reflector 132 has a proximal end 131p and a distal end 131d. As in the examples of FIGS. 13A and 13B, the optical fiber 10 is arranged within interior 133 of radiation-redirecting device 130 such that the centerline 12 of optical fiber 10 lies along the central axis A2. In an example, the reflector 132 includes aperture 136, which defines an input location for radiation beam 112B.

In an example, the optical axis A1 associated with radiation beam 112B is disposed at an angle to the central axis A2 of reflector 132 so that radiation beam 112B is launched into the interior 133 of the reflector at proximal end 131p (FIG. 14A) or through aperture 136 (FIG. 14B) at an oblique or skew angle that includes an x-component. The skew angle of radiation beam 112B is selected such that it undergoes a first reflection from reflective inner surface 134 and is directed toward the central axis A2 and thus to optical fiber 10. Note that in this example, radiation-redirecting device 130 can be said to perform the function of focusing optical system 120 in that the first reflection directs the radiation beam 112B to be incident upon optical fiber 10.

The coating 50 and central glass portion 40 refract radiation beam 112B as discussed above in connection with FIG. 3, thereby causing the radiation beam to become divergent. The divergent radiation beam 112B travels to the opposite side of reflective inner surface 134 (while also traveling a certain distance in the x-direction) and undergoes a second reflection therefrom to form redirected radiation beam 112BD. The curved reflective inner surface 134 and the skew angle of the initial radiation beam 112B serve to focus the redirected radiation beam 112BD generally at the location of optical fiber 10 while also causing the radiation beam have helical-like optical path down the reflector 132. The curved reflective inner surface 134 acts to define a number of focus positions 124 along the length of optical fiber 10. The coating 50 undergoes optical damage at the focus positions 124, resulting in the formation of corresponding damaged coating portions 50D. In an example best seen in FIG. 14B, the skew angle of the incident radiation beam 112B can defined such that the focus positions 124 are located close to one another in the x-direction so that the damaged coating portions 50D are also close to one another. In an example, the damaged coating portions 50D are immediately adjacent one another so that they collectively form a substantially continuous damaged coating portion.

In an example of the irradiation process, at the first focus position 124, the radiation beam 112 damages coating 50 to define a first damaged coating portion 50D. Continued irradiation results in the removal of the damaged coating portion, leaving the central glass portion 40. This reduces the amount of radiation beam 112B absorbed at the first focus position 124 so that there now is more optical power available at the downstream focus positions, and in particular the second focus position immediately downstream of the first focus position. Thus, in an example, the irradiation and stripping process starts at the first focus position 124 and sequentially moves down the length of optical fiber 10 to the different focus positions. The radius and length of cylinder 132 and the skew angle of radiation beam 112B can be selected to define a desired number of focus positions 124 and their relative proximity to one another.

Figure 14C:
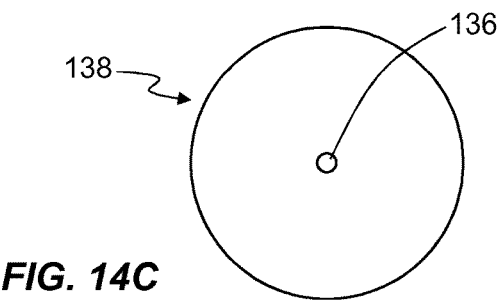
FIG. 14C is a front-on view of an example radiation blocking feature in the form of a disc that includes a central aperture sized to accommodate the optical fiber along the central axis A2 of the radiation-redirecting device.

In an example, radiation-recycling optical system 130 includes a radiation-blocking feature arranged to block radiation 112 from traveling beyond a certain distance. In the example of FIGS. 14A and 14B, the radiation-blocking feature can be located at distal end 131d and can be in the form of a wall that generally absorbs radiation 112. FIG. 14C is a front-on view of an example radiation-blocking feature 138 in the form of a disc that can be arranged at the distal end 131d of reflector 132. Different shapes for the radiation-blocking feature 138 can be employed that match the cross-sectional shape of cylinder 132. The radiation-blocking feature 138 includes an aperture 136 sized to allow for optical fiber 10 to be arranged along central axis A2 without allowing a substantial amount of radiation 112 to escape from interior 133 of reflector 132.

Figure 15A:
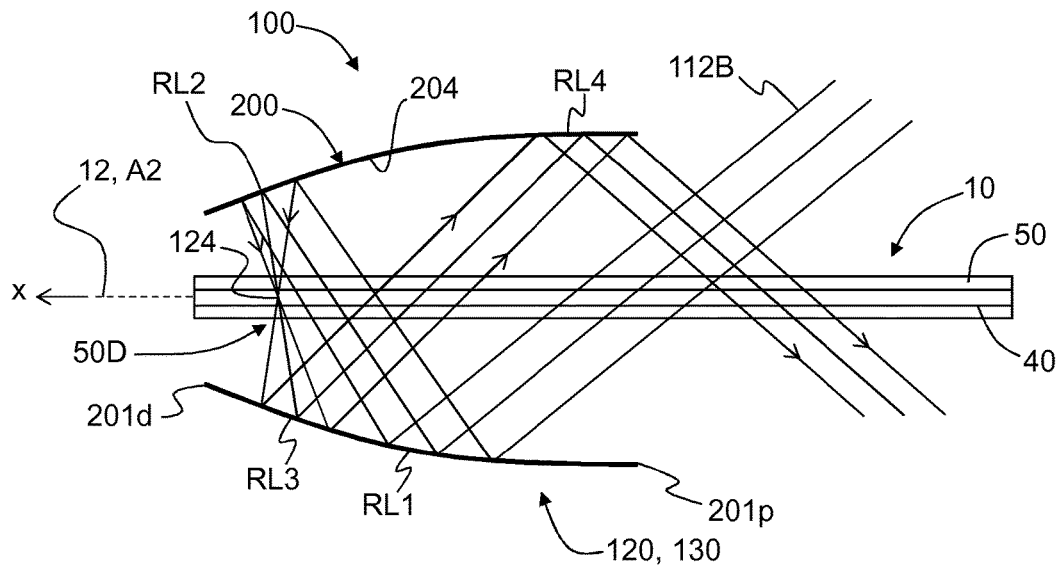
FIGS. 15A and 15B are schematic cross-sectional diagrams of example optical systems that include a parabolic mirror configured so that the irradiation used to irradiate the optical fiber coating does not exit the distal end of the mirror.

FIG. 15A is a schematic diagram of an example optical system 100 wherein the focusing system 120 is combined with the radiation-redirecting device 130 in the form of a rotationally symmetric curved reflector ("curved reflector") 200, which has central axis A2, a proximal end 201p, a distal end 201d, and a reflective inner surface 204. Example curved reflectors 200 have a paraboloid, an ellipsoid, or a hyperboloid shape.

The optical fiber 10 lies along central axis A2 of curved reflector 200. The radiation source 110 is arranged to direct a collimated radiation beam 112B into curved reflector 200 at proximal end 201p at a skew angle relative to central axis A2. The radiation beam 112B is directed to reflect from reflective inner surface 204 at a first reflection location RL1 and then a second reflection location RL2. The first and second reflections form a focused radiation beam 112B having a focus position 124 at optical fiber 10. The focused radiation beam 112B irradiates optical fiber 10 and coating 50 thereon to form damaged coating portion 50D. A portion of the radiation beam 112B travels through optical fiber 10 and reflects from a third reflection location RL3 and then a fourth reflection location RL4, and then out of proximal end 201p.

The curvature of reflector 200 is designed to prevent radiation 112 from exiting the distal end 201d, so that the reflector has a natural radiation-blocking configuration that obviates the need for a separate radiation-blocking feature 138. In an example, optical fiber 10 is translated in the x-direction as needed define a select amount of damaged coating portion 50D, which can be removed by further irradiation as described above.

Figure 15B:
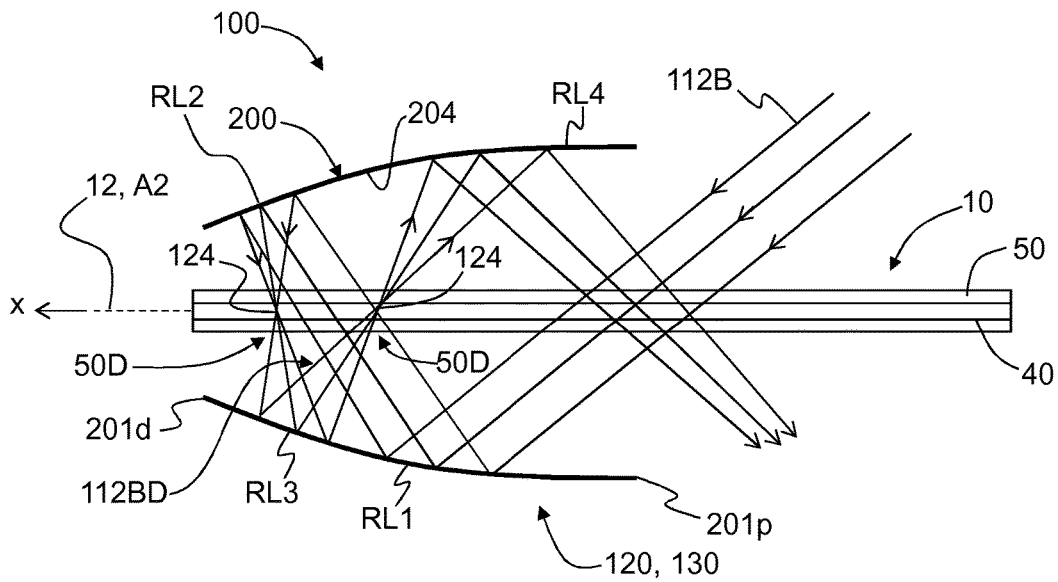

In an example illustrated in FIG. 15B, the curvature of curved reflector 200 is designed so that the redirected radiation beam 112BD that reflects from the third reflection location RL3 defines along optical fiber 10 a second focus position 124 that is closer to the proximal end 201p than the first focus position 124 defined by reflection of radiation beam 112B at the second reflection location RL2.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of stripping a coating from an optical fiber, wherein the coating comprises an acrylate, has an optical-damage threshold, and surrounds a central glass portion of the optical fiber, the method comprising:
a) irradiating a first portion of the coating with a first beam of radiation having a processing wavelength at which the coating is substantially transparent and an intensity that exceeds the optical-damage threshold of the coating to form a first damaged coating portion that has an increased absorption to the radiation at the processing wavelength, wherein at least a portion of the first beam passes through the central glass portion of the optical fiber;

b) receiving the at least a portion of the first beam that has passed through the central glass portion and redirecting it as one or more redirected beams of the radiation i) to the first portion of the coating to assist in removing the first damaged coating portion, or ii) to one or more second additional portions of the coating to form one or more additional damaged coating portions that each have an increased absorption to the radiation at the processing wavelength, wherein at least a portion of the one or more redirected beams of the radiation passes through the central glass portion of the optical fiber; and repeating step b) for the at least a portion of the one or more redirected beams of the radiation that has passed through the central glass portion to form one or more additionally-redirected beams of the radiation that i) further assist in removing the first damaged coating portion, or ii) assist in removing the one or more additional damaged coating portions;

wherein step b) is repeated until the first damaged coating portion and the one or more additional damaged coating portions are removed by the radiation, thereby exposing a section of the central glass portion.

2. The method according to claim 1, wherein the processing wavelength is in the range from 270 nm to 445 nm.

3. The method according to claim 1, wherein the first beam has a first focus position at the coating and the one or more redirected beams have respective second focus positions at the coating.

4. The method according to claim 1, wherein said receiving and redirecting in step b) includes reflecting the at least a portion of the first beam with an inner reflective surface of a reflector.

5. The method according to claim 1, wherein said receiving and redirecting in step b) includes reflecting the at least a portion of the first beam with an inner reflective surface of a curved reflector that has either a paraboloid, ellipsoid or hyperboloid shape.

6. A method of processing an optical fiber having a central glass portion and a coating surrounding the central glass portion, wherein the coating comprises an acrylic, is transparent to a processing wavelength, and has an optical-damage threshold intensity at the processing wavelength, the method comprising:

a) irradiating a first portion of the coating with a first beam of radiation having the processing wavelength in the range from 270 nm to 445 nm, and having an intensity greater than the optical-damage threshold intensity to create a first damaged coating portion that has an increased absorption to the radiation at the operating wavelength, wherein at least a portion of the first beam passes through the central glass portion of the optical fiber;

b) using a radiation-redirecting device, receiving the at least a portion of the first beam that has passed through the central glass portion and redirecting it to at least a second portion of the coating as a second beam of the radiation that has an intensity greater than the optical-damage threshold intensity to create at least a second damaged coating portion, wherein at least a portion of the second beam passes through the central glass portion of the optical fiber; and c) removing the first damaged coating portion and the at least second damaged coating portions from the central glass portion by irradiating the first and at least second damaged coating portions with the radiation having the processing wavelength.

7. The method according to claim 6, wherein said removing includes multiple passes of the radiation through the first and at least second damaged coating portions.

8. The method according to claim 6, further including forming the first and the at least second damaged coating portions to be immediately adjacent each other.

9. The method according to claim 6, wherein the optical fiber has a centerline and wherein the radiation-redirecting device includes a reflector having a central axis, an interior and a reflective inner surface, and wherein the optical fiber centerline lies along the central axis.

10. The method according to claim 9, further comprising directing the first beam to enter the interior of the reflector at a skew angle.

11. The method according to claim 6, including after performing steps a) and b), moving the optical fiber and repeating steps a) and b) to form new first and at least second damaged coating portions.

12. The method according to claim 6, wherein the radiation-redirecting device has a paraboloidal, ellipsoidal or hyperboloidal shape.

13. The method according to claim 6, further including substantially blocking the first beam and the second beam from exiting the radiation-redirecting device.

14. The method according to claim 1, wherein step a) comprises forming the first damaged coating portion with the at least a portion of the first beam that passes through the central glass portion.

15. The method according to claim 14, wherein step a) comprises directing the first beam to be incident on a front side of the optical fiber, and wherein a curved outer surface at the front side of the optical fiber focuses the at least a portion of the first beam that passes through the central glass portion so that the intensity of the first beam at a back side of the optical fiber is greater than at the front side.

16. The method according to claim 6, wherein step a) comprises forming the first damaged coating portion with the at least a portion of the first beam that passes through the central glass portion.

17. The method according to claim 16, wherein step a) comprises directing the first beam to be incident on a front side of the optical fiber, and wherein a curved outer surface at the front side of the optical fiber focuses the at least a portion of the first beam that passes through the central glass portion so that the intensity of the first beam at a back side of the optical fiber is greater than at the front side.

18. A method of processing an optical fiber having a central glass portion and a coating surrounding the central glass portion, wherein the coating comprises an acrylic, is transparent to a processing wavelength, and has an optical-damage threshold intensity at the processing wavelength, the method comprising:

a) irradiating the coating with radiation having the processing wavelength in the range from 270 nm to 445 nm, and having an intensity greater than the optical-damage threshold intensity to create a damaged coating portion that has an increased absorption to the radiation at the operating wavelength, wherein at least a portion of the radiation passes through the central glass portion of the optical fiber;

b) using a radiation-redirecting device to receive the at least a portion of the radiation that has passed through the central glass portion and to redirect the at least a portion of the radiation back to the optical fiber;

wherein step b) is repeated multiple times so that: i) the radiation creates multiple damaged coating portions, and ii) the radiation removes the multiple damaged coating portions to expose the central glass portion.

19. The method according to claim 18, wherein step a) comprises forming the damaged coating portion with the at least a portion of the of the radiation that passes through the central glass portion.

20. The method according to claim 19, wherein step a) comprises directing the radiation as a beam incident on a front side of the optical fiber, and wherein a curved outer surface at the front side of the optical fiber focuses the at least a portion of the radiation that passes through the central glass portion so that the intensity of the beam at a back side of the optical fiber is greater than at the front side.

\* \* \* \* \*

UNITED STATES PATENT AND TRADEMARK OFFICE
CERTIFICATE OF CORRECTION

PATENT NO. : 9,891,384 B2  
APPLICATION NO. : 14/561645  
DATED : February 13, 2018  
INVENTOR(S) : Anthony Sebastian Bauco et al.

Page 1 of 1

It is certified that error appears in the above-identified patent and that said Letters Patent is hereby corrected as shown below:

On the Title Page

On page 2, Column 2, item (56), other publications, Line 6, delete "Retireved" and insert -- Retrieved --, therefor.

On page 2, Column 2, item (56), other publications, Line 16, delete "0.532-[MU]Lasaer" and insert -- 0.532-[MU]M Laser --, therefor.

In the Claims

In Column 13, Line 10, Claim 1, before "additional" delete "second".

In Column 15, Line 9, Claim 19, delete "of the of the" and insert -- of the --, therefor.

Signed and Sealed this  
Twenty-fourth Day of December, 2019

Andrei Iancu  
*Director of the United States Patent and Trademark Office*